(12) United States Patent
Nakaie et al.

(10) Patent No.: US 7,334,666 B2
(45) Date of Patent: Feb. 26, 2008

(54) DISK BRAKE

(75) Inventors: Hirokatsu Nakaie, Saitama (JP); Yoshinobu Honda, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 11/068,844

(22) Filed: Mar. 2, 2005

(65) Prior Publication Data

US 2005/0194221 A1    Sep. 8, 2005

(30) Foreign Application Priority Data

Mar. 5, 2004    (JP) ............................. 2004-063115

(51) Int. Cl.
*F16D 65/40* (2006.01)

(52) U.S. Cl. ................ 188/73.38; 188/250 E

(58) Field of Classification Search ............. 188/73.38, 188/73.31, 73.35, 73.36, 73.37, 250 D, 250 E, 188/250 F See application file for complete search history.

(56) References Cited

U.S. PATENT DOCUMENTS

| | | | |
|---|---|---|---|
| 4,422,534 A | 12/1983 | Oshima | |
| 4,607,728 A | 8/1986 | Kobayashi | |
| 5,125,482 A | 6/1992 | Negishi | |
| 5,388,670 A | 2/1995 | Kuskye et al. | |
| 5,699,882 A * | 12/1997 | Ikegami et al. | 188/73.38 |
| 5,901,815 A * | 5/1999 | Kobayashi et al. | 188/7 |
| 5,941,348 A * | 8/1999 | Matsumoto et al. | 188/73.38 |
| 5,947,233 A | 9/1999 | Kobayashi et al. | |
| 5,954,163 A * | 9/1999 | Suzuki et al. | 188/73.38 |
| 6,186,288 B1 * | 2/2001 | Baba et al. | 188/73.36 |
| 6,223,866 B1 * | 5/2001 | Giacomazza | 188/73.38 |
| 6,450,301 B1 * | 9/2002 | Iizuka et al. | 188/26 |
| 2003/0006078 A1 | 1/2003 | Buell et al. | |
| 2004/0016610 A1 * | 1/2004 | Morris | 188/73.31 |

FOREIGN PATENT DOCUMENTS

| | | |
|---|---|---|
| DE | 196 12 734 A1 | 10/1997 |
| DE | 100 50 013 A1 | 4/2002 |
| DE | 102 33 446 A1 | 2/2004 |
| EP | 0 352 559 A1 | 1/1990 |
| EP | 1 375 952 A2 | 1/2004 |
| JP | 10-122278 A | 5/1998 |
| JP | 2001-234955 A | 8/2001 |
| WO | WO 03/027527 A1 | 4/2003 |

* cited by examiner

*Primary Examiner*—Devon Kramer
(74) *Attorney, Agent, or Firm*—Birch, Stewart, Kolasch & Birch, LLP

(57) ABSTRACT

A disk brake including friction pads disposed opposite to a brake disk, a bracket provided with support portions for movably supporting the friction pads so as to permit sliding along the axial direction of the brake disk, and retainers each interposed between the friction pad and the support portions, to restrain at least movements of the retainers relative to the support portions of the bracket. Of a pad holding force with which the retainer holds the friction pad, and a retainer supporting force for supporting the retainer on the support portion, at least the retainer supporting force is set to be not less than a received force exerted on the friction pad due to vibration. The resulting configuration prevents generation of rattling sounds due to the vibration.

24 Claims, 8 Drawing Sheets

DISK BRAKE

CROSS-REFERENCE TO RELATED APPLICATION

The present application claims priority under 35 U.S.C. § 119 to Japanese Patent Application No. 2004-063115, filed Mar. 5, 2004, the entire contents of which are hereby incorporated by reference.

BACKGROUND OF THE INVENTION

1. Field of the Invention

The present invention relates to a disk brake including friction pads disposed opposite to a brake disk, a bracket provided with support portions for movably supporting the friction pad so as to permit sliding along the axial direction of the brake disk, and retainers each interposed between the friction pad and the support portion.

2. Description of Background Art

A disk brake in which retainers are interposed between both ends of a friction pad along the circumferential direction of a brake disk and support portions provided on a bracket is disclosed, for example, in Japanese Patent Laid-open No. Hei 10-122278. In this disk brake, the friction pad is springily held by the retainers, whereby displacements of the friction pad relative to the retainers are restrained, and generation of sounds is prevented.

However, if the retainer is moved relative to the support portion of the bracket when a vibration is exerted on the friction pad, the retainer may collide on the support portion to generate a sound, and there is no disclosure in Japanese Patent Laid-open No. Hei 10-122278 about the technology for preventing the generation of the sound attendant on the movement of the retainer.

SUMMARY AND OBJECTS OF THE INVENTION

The present invention has been made in consideration of the above circumstances. Accordingly, it is an object of the present invention to provide a disk brake so configured as to restrain at least movements of a retainer relative to a support portion of a bracket, thereby preventing generation of sounds.

In order to attain the above object, a first aspect of the present invention, a disk brake is provided with friction pads disposed opposite to a brake disk, a bracket provided with support portions for movably supporting the friction pads so as to permit sliding along the axial direction of the brake disk, and retainers each interposed between the friction pad and the support portion. Further, of a pad holding force with which the retainer holds the friction pad and a retainer supporting force for supporting the retainer on the support portion, at least the retainer supporting force is set to be not less than a received force exerted on the friction pad due to vibration.

In addition, according to a second aspect of the present invention, the pad holding force is set to be not less than the received force and not more than the retainer supporting force.

According to a third aspect of the present invention, the disk brake is mounted to a swing arm which rotatably supports an axle of a rear wheel of a vehicle, and which is provided with an opening portion in a central portion thereof, so that a part of the disk brake is disposed in the opening portion.

Furthermore, according to a fourth aspect of the present invention, the retainers are each fixed to the bracket by fixing means other than the retainer.

According to the first aspect of the invention, at least the retainer supporting force for supporting the retainer on the support portion is set to be not less than the received force exerted on the friction pad due to vibration. Therefore, against the received force exerted on the friction pad owing to vibration exerted on the friction pad or the like, the retainer can be supported so as not to move relative to the support portion of the bracket, whereby at least movements of the retainer relative to the support portion of the bracket can be restrained, and generation of sounds can be prevented.

In addition, according to the second aspect of invention, the pad holding force with which the retainer holds the friction pad is also set to be not less than the received force on the friction pad. Therefore, it is possible not only to restrain movements of the retainer relative to the support portion of the bracket but also to restrain relative movements of the friction pad and the retainer, whereby generation of sounds can be prevented more effectively. Moreover, since the pad holding force with which the friction pad is held by the retainer is not set to be irrationally large, optimum designing of the retainer can be carried out speedily.

According to the third aspect of the invention, even though a part of the disk brake is disposed in the opening portion of the swing arm where resonance of sounds is liable to occur, generation of sounds can be restrained, so that the degree of freedom in laying out the disk brake relative to the swing arm can be enhanced.

Furthermore, according to the fourth aspect of the invention, the retainer supporting force for supporting the retainer on the support portion can be easily set to be not less than the received force exerted on the friction pad from the brake disk.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
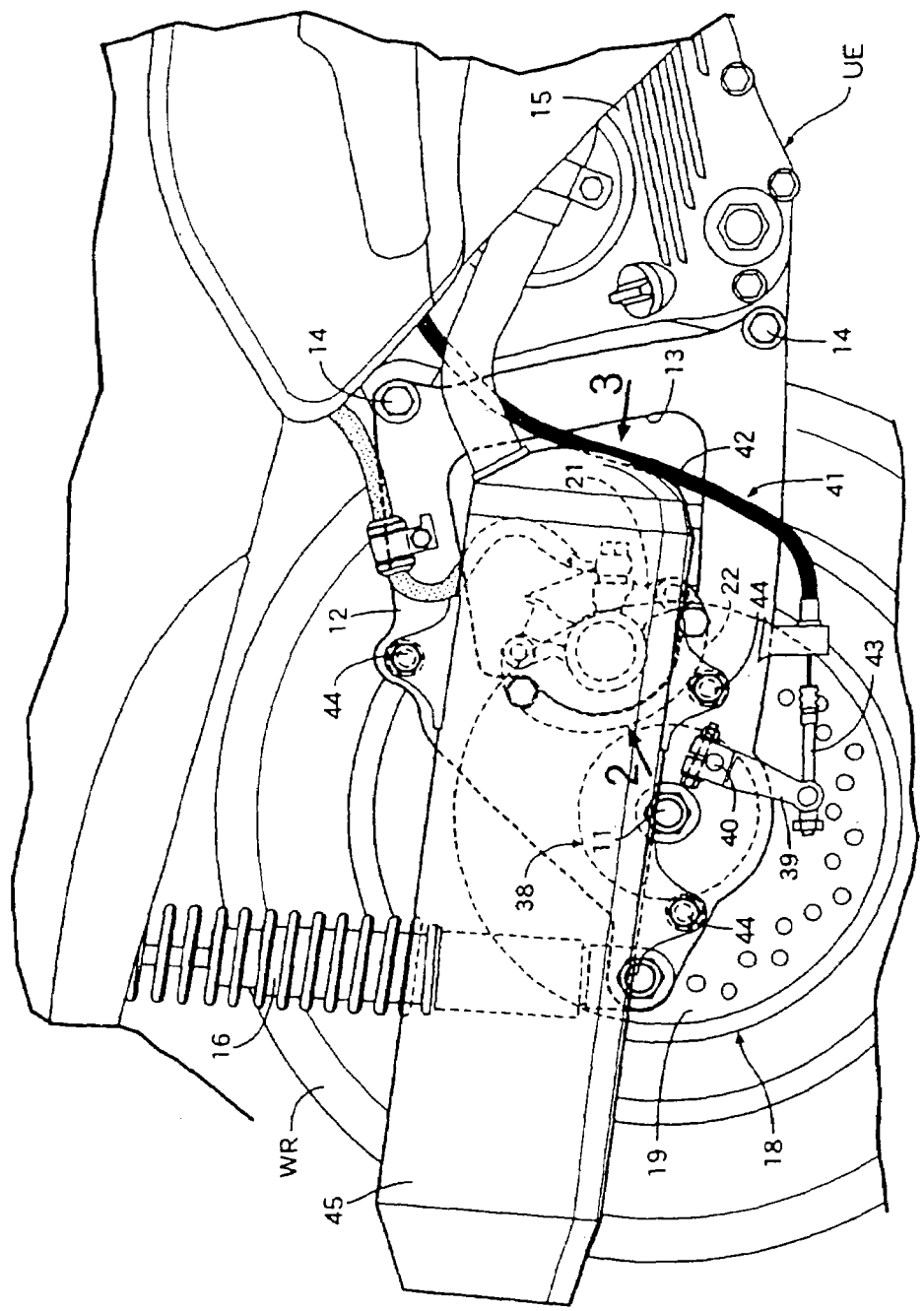
FIG. 1 is a right side view of a rear portion of a motor scooter type vehicle, showing a first embodiment.

First, in FIG. 1, a unit swing engine UE for producing power for driving a rear wheel WR is vertically swingably mounted on the motor scooter type vehicle, with its rear portion disposed on the left side of the rear wheel WR, and an axle 11 of the rear wheel WR is rotatably supported between a rear portion of a swing arm 12, which is connected to the unit swing engine UE and is disposed on the right side of the rear wheel WR, and a rear portion of the unit swing engine UE.

The swing arm 12 is provided in a roughly central portion thereof with an opening portion 13 so formed that its vertical width decreases toward the rear side, and the swing arm 12 is so formed that its side view is a roughly triangular shape narrowed on the rear end side. Upper and lower two portions in a front portion of the swing arm 12 are fastened to a crankcase 15 possessed by the unit swing engine UE by bolts 14, 14, and the lower end of a rear cushion 16 is connected to the rear end of the swing arm 12 on the rear side relative to the axle 11 of the rear wheel WR.

Figure 2:
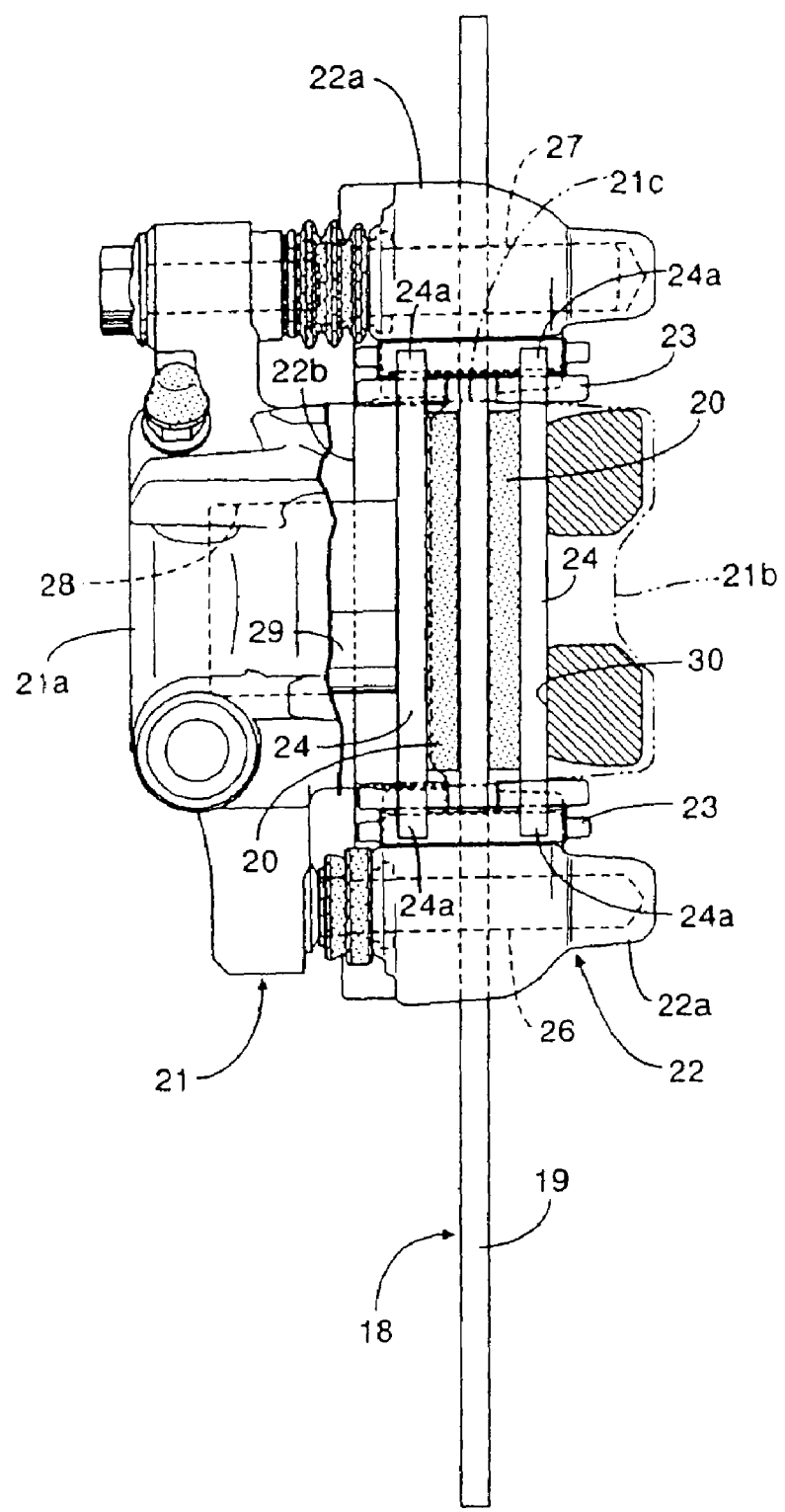
FIG. 2 is a view along arrow 2 of FIG. 1.
Figure 3:
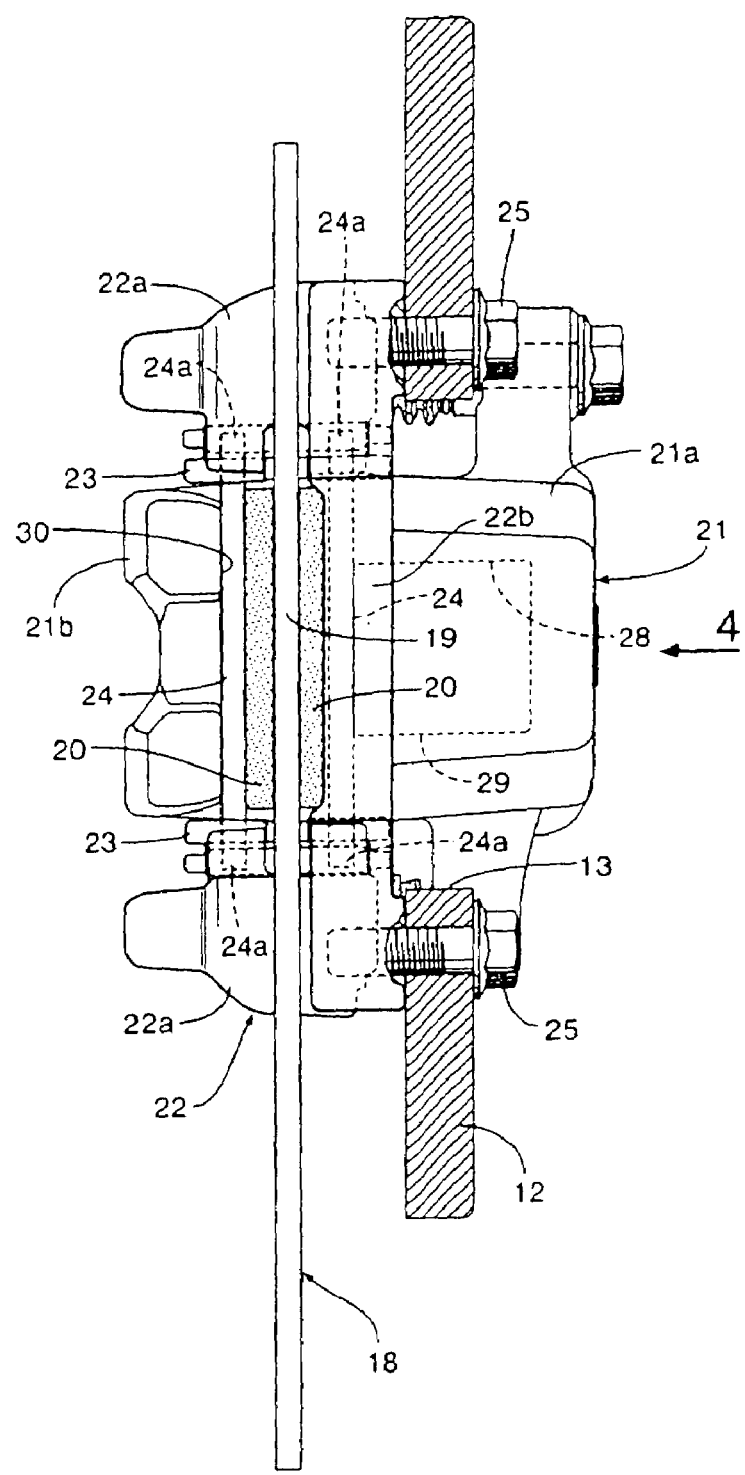
FIG. 3 is a view along arrow 3 of FIG. 1.
Figure 4:
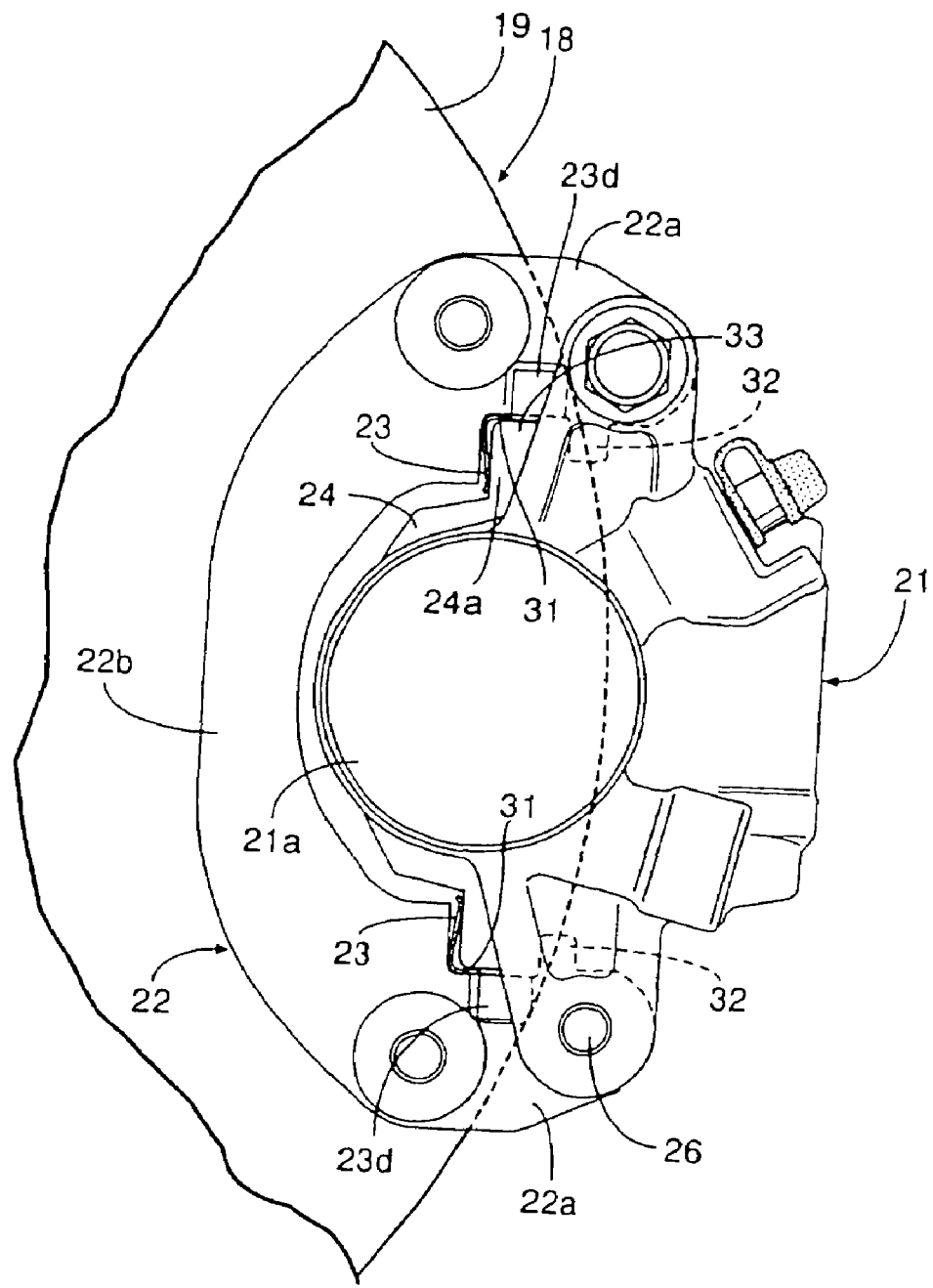
FIG. 4 is a view of a disk brake as viewed along arrow 4 of FIG. 3.

Referring to FIGS. 2 to 4 also, a disk brake 18 mounted to the rear wheel WR includes a brake disk 19 rotated together with the rear wheel WR, a pair of friction pads 20, 20 disposed opposite to both surfaces of the brake disk 19 respectively, and a caliper body 21 a part of which is disposed in the opening portion 13 of the swing arm 12. Also included are a bracket 22 fixed to the swing arm 12 while movably supporting the caliper body 21 so as to permit sliding in a direction parallel to the rotational axis of the brake disk 19 and while movably supporting both the friction pads 20, 20 so as to permit sliding in directions parallel to the rotational axis of the brake disk 19, and a pair of retainers 23, 23 interposed respectively between the friction pads 20, 20 and the bracket 22.

The bracket 22 integrally comprises a pair of support portions 22a, 22a which are disposed at positions spaced from each other along the circumferential direction of the brake disk 19 and which are formed in a roughly U shape so as to be situated astride an outer circumferential portion of the brake disk 19, and a connection portion 22b for connection between the support portions 22a, 22a.

Back metals 24 . . . of both the friction pads 20 include shoulder portions 24a, 24a . . . at their both ends along the circumferential direction of the brake disk 19, and the shoulder portions 24a, 24a . . . are slidably fitted to the support portions 22a, 22a of the bracket 22 through the retainers 23, 23.

The connection portion 22b is disposed between the brake disk 19 and the swing arm 12, and the connection portion 22b is mounted to the swing arm 12 by a pair of bolts 25, 25 on the rear side of the opening portion 13.

The caliper body 21 is composed of an action portion 21a and a reaction portion 21b which are disposed respectively on both sides of the brake disk 19, and a bridge portion 21c situated astride the brake disk 19 and making connection between the action portion 21a and the reaction portion 21b, and the action portion 21a is disposed in a rear portion of the inside of the opening portion 13.

The action portion 21a of the caliper body 21 is connected to both the support portions 22a, 22a of the bracket 22 through a pair of slide pins 26, 27 which are parallel to the rotational axis of the brake disk 19, and the caliper body 21 is movably supported on the bracket 22 so as to be slidable in a direction parallel to the rotational axis of the brake disk 19.

The action portion 21a is provided with a cylinder bore 28 opened on the side of the brake disk 19, and a brake piston 29 capable of pushing the back metal 24 of one of the friction pads 20 toward the side of the brake disk 19 is slidably fitted in the cylinder bore 28. Besides, the reaction portion 21b is provided with a pushing surface 30 capable of evenly pushing the back metal 24 of the other of the friction pads 20.

Figure 5:
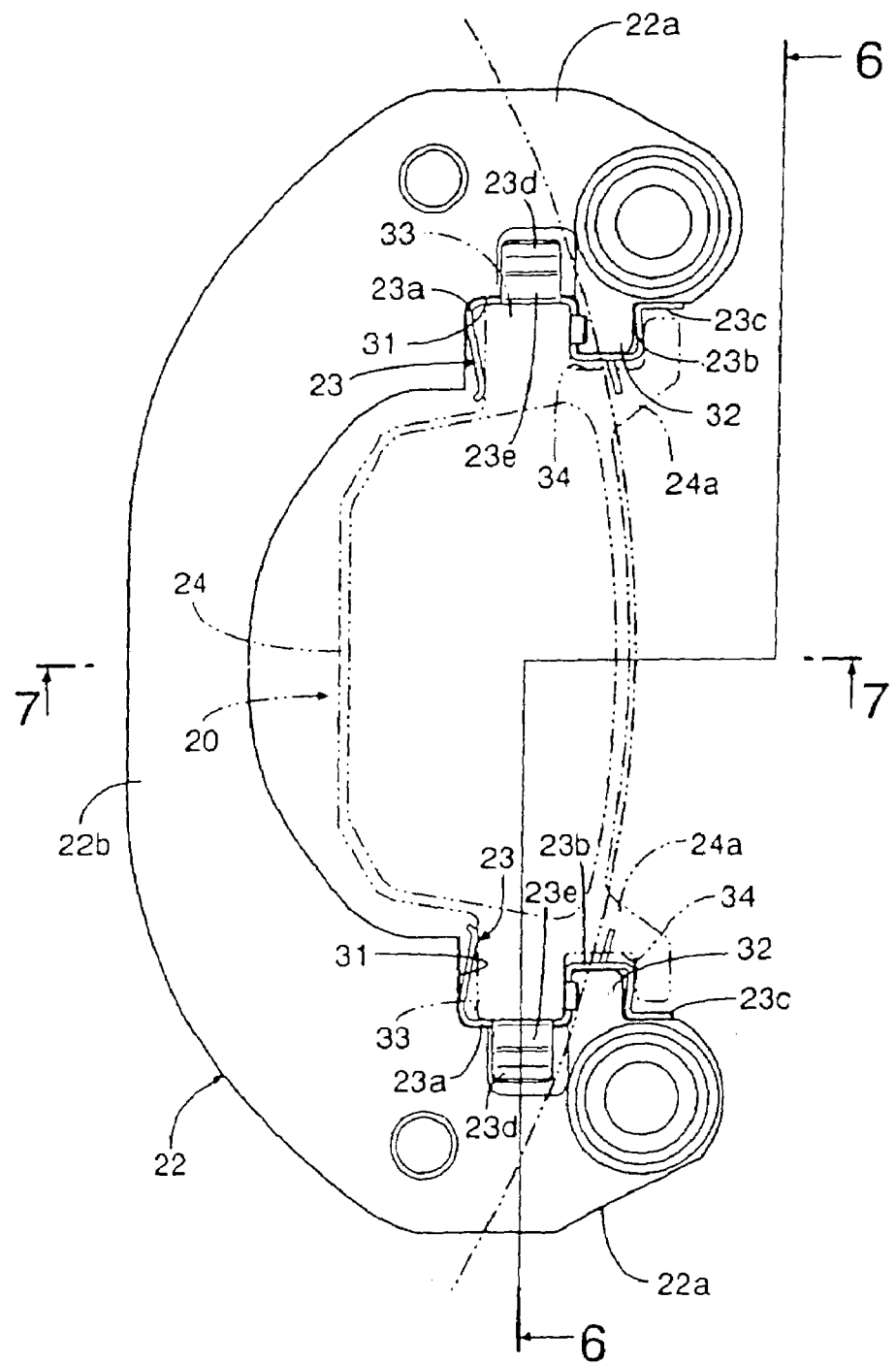
FIG. 5 is a view of a bracket and a retainer as viewed in the same direction as FIG. 4 and is a view along arrow 5 of FIG. 6.
Figure 6:
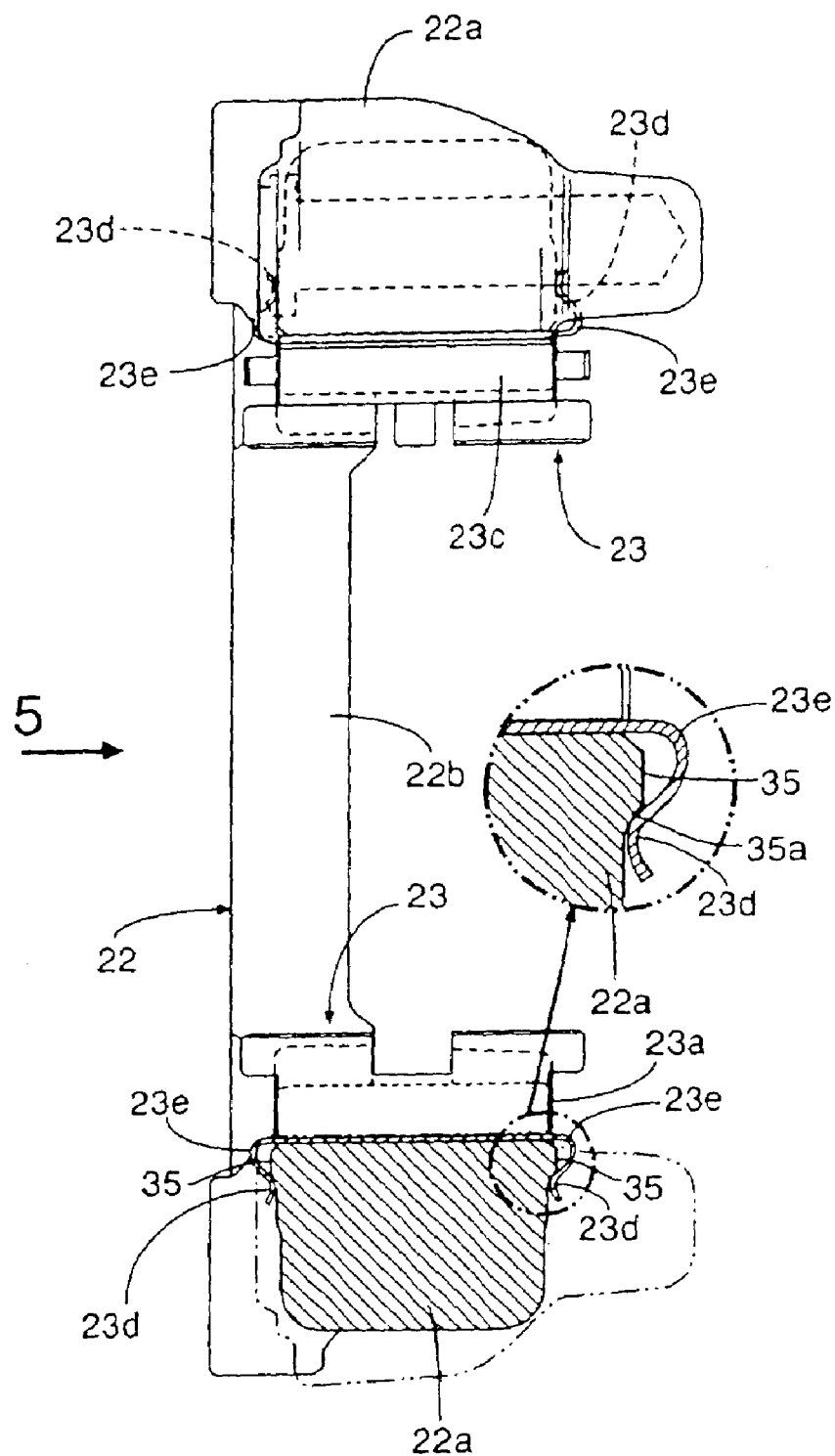
FIG. 6 is a sectional view along line 6-6 of FIG. 5.
Figure 7:
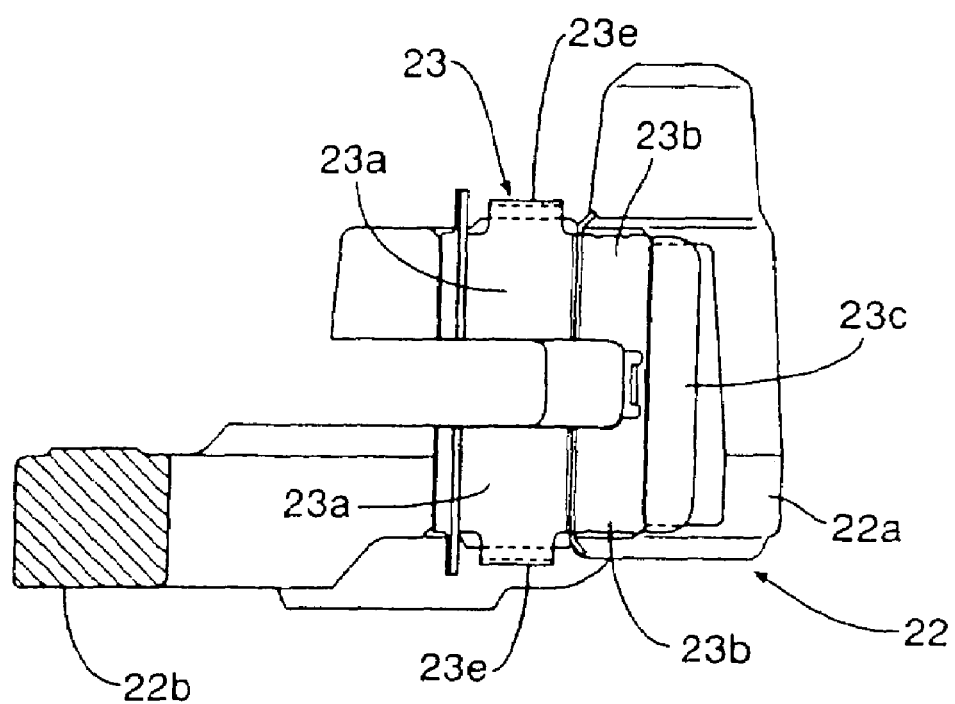
FIG. 7 is a sectional view along line 7-7 of FIG. 5.

Referring to FIGS. 5 to 7 also, surfaces, opposed to both end portions of the friction pads 20 . . . along the circumferential direction of the brake disk 19, of the support portions 22a, 22a of the bracket 22 are provided with guide grooves 31 extending in the axial direction of the brake disk 19 and with guide projections 32 formed adjacent to the guide grooves 31 so as to form one-side surfaces of the guide grooves 31, in one pair each in correspondence with the friction pads 20, respectively. On the other hand, the shoulder portions 24a, 24a of the back metals 24 of both the friction pads 20 are provided with projections 33 corresponding to the guide grooves 31 and with recessed grooves 34 corresponding to the guide projections 32, for recess-projection engagement with the guide grooves 31 and the guide projections 32.

The retainer 23 integrally comprises a pair of first holding portions 23a formed in a roughly U shape for springy fitting therein of the projections 33 on the shoulder portions 24a of the back metals 24 of the pair of friction pads 20, a pair of second holding portions 23b which are formed in a roughly U shape opened to the opposite side of the first holding portions 23a so as to permit springy fitting therein of the guide projections 32 on the support portion 22a of the bracket 22 and which are continuous with the first holding portions 23a, and a connection portion 23c situated astride the outer circumference of the brake disk 19 and making connection between the second holding portions 23b. The retainer 23 is formed by bending a metal plate.

The first holding portion 23a with the projection 33 of the back metal 24 spring-fitted therein is spring-fitted in the guide groove 31 of the support portion 22a. In addition, the second holding portion 23b with the guide projection 32 of the support portion 22a spring-fitted therein is spring-fitted in the recessed groove 34 of the back metal 24.

Moreover, the retainer 23 integrally comprises a pair of clamping pawls 23d, 23d for clamping the support portion 22a from both sides along the axial direction of the brake disk 19, and the clamping pawls 23d are continuous with the first holding portions 23a. In addition, the clamping pawls 23d, 23d are provided with curved portions 23e, 23e, and the clamping pawls 23d spring-clamp the support portion 22a from both sides by springy forces generated by bending the curved portions 23e.

On the other hand, as clearly shown in FIG. 6, on both side surfaces of the support portion 22a of the bracket 22, projected portions 35, 35 are provided. These are formed in, for example, a trapezoidal shape having inclined surfaces 35a, 35a inclined so as to come closer to each other as one goes away from the friction pad 20 and fronting on the opposite side of the friction pad 20. The clamping pawls 23d of the retainer 23 having the first and second holding portions 23a, 23b abutting on surfaces, fronting on the side of the friction pad 20, of the support portion 22a make springy abutment on the inclined surfaces 35a of both the projected portions 35 so as to be situated astride the projected portions 35 at the curved portions 23e.

In the disk brake 18 as above, a vibrational acceleration applied to the friction pad 20 due to vibration or the like is, for example, 5 to 40 G. Therefore, the received force exerted on the whole part of the friction pad 20 is 5 to 40 M, where M is the weight of the friction pad 20. Since the retainers 23 are mounted respectively to the pair of support portions 22a, 22a of the bracket 22, the received force on the friction pad 20 shared by the retainer 23 on one side is 2.5 to 30 M.

Of a pad holding force with which the retainer 23 holds the friction pad 20 and a retainer supporting force for supporting the retainer 23 on the support portion 22a of the bracket 22, at least the retainer supporting force is set to be not less than the received force. In this embodiment, the pad holding force is set to be not less than the received force, and not more than the retainer supporting force.

The pad holding force with which the retainer 23 holds the friction pad 20 is a frictional force generated by springy contact of the first and second holding portions 23a, 23b of the retainer 23 with the shoulder portion 24a of the back metal 24. On the other hand, the retainer supporting force for supporting the retainer 23 on the support portion 22a of the bracket 22 is equal to a frictional force generated by springy contact of the first and second holding portions 23a, 23b of the retainer 23 with the support portion 22a, plus a springy holding force generated by springy contact of the clamping pawls 23d with both side surfaces of the support portion 22a.

In FIG. 1 again, a drum brake 38 for parking brake is mounted to a hub of the rear wheel WR, a lever 39 for putting the drum brake 38 into a braking action is disposed on the outside of the swing arm 12, and a rotary shaft 40 to which the base end of the lever 39 is attached penetrates through the swing arm 12 in a turnable manner and is projected into the drum brake 38. On the other hand, an end portion of an outer cable 42 of a brake cable 41 is supported on a lower portion of the swing arm 12, and an end portion of an inner cable 43 protruding from an end portion of the outer cable 42 is connected to a tip end portion of the lever 39.

An exhaust muffler 45 is fastened to the swing arm 12 by bolts 44, and the exhaust muffler 45 is disposed on the outside of the swing arm 12 so as to cover from the outside the caliper body 21 disposed in the opening portion 13.

Now, functions of this embodiment will be described below. The shoulder portions 24a, 24a of the back metal 24 of the friction pads 20 at both their end portions along the circumferential direction of the brake disk 19 are movably supported on the support portions 22a, 22a of the bracket 22 through the retainers 23, 23, and the retainer 23 is provided with the pair of clamping pawls 23d, 23d for clamping the support portion 22a from both sides along the axial direction of the brake disk 19. Therefore, at the time of mounting the retainers 23 to the support portions 22a of the bracket 22, positioning along the axial direction of the brake disk 19 can be easily carried out.

In addition, the clamping pawls 23d are provided for spring-clamping the support portion 22a of the bracket 22 from both sides. Therefore, the retainer 23 is supported on the support portion 22a with the retainer supporting force which is equal to the sum of the frictional force acting between the first and second holding portions 23a, 23b of the retainer 23 and the springy force exerted by the clamping pawls 23d . . . , so that the retainer supporting force can be set to a comparatively high value.

Moreover, on both side surfaces of the support portion 22a of the bracket 22, projected portions 35, 35 are provided and have inclined surfaces 35a, 35a inclined so as to come closer to each other as one goes away from the friction pad 20 and fronting on the opposite side of the friction pad 20. The clamping pawls 23d abut on the inclined surfaces 35a of both the projected portions 35 while having parts of the first and second holding portions 23a, 23b in abutment on the surfaces, fronting on the side of the friction pad 20, of the support portions 22a.

Thus, with the pair of clamping pawls 23d in springy contact with the inclined surfaces 35a of the projected portion 35, the reaction force exerted on the clamping pawls 23d, i.e., on the retainer 23 from the inclined surfaces 35a leads to the generation of a component force along the circumferential direction of the brake disk 19, so that the retainer 23 can be prevented from coming off from the support portion 22a.

In addition, of the pad holding force with which the retainer 23 holds the friction pad 20 and the retainer supporting force for supporting the retainer 23 on the support portion 22a, at least the retainer supporting force is set to be not less than the received force exerted on the friction pad 20 from the brake disk 19. Therefore, against the received force exerted on the friction pad 20 due to vibration or the like exerted on the friction pad 20, the retainer 23 can be supported so as not to move relatively to the support portion 22a of the bracket 22. Thus, at least movements of the retainer 23 relative to the support portion 22a of the bracket 22 can be prevented, and generation of sounds can be prevented.

Furthermore, since the pad holding force is set to be not less than the received force and not more than the retainer supporting force, it is possible not only to restrain the retainer 23 from moving relative to the support portion 22a of the bracket 22, but also to restrain relative movements of the friction pad 20 and the retainer 23, whereby generation of sounds can be prevented more effectively. Moreover, since the holding force for holding the friction pad 20 by the retainer 23 is not set to be irrationally large, optimum designing of the retainer 23 can be performed speedily.

The swing arm 12 is provided with the opening portion 13 in its central portion, and the disk brake 18 is mounted to the swing arm 12 so that a part of the disk brake 18 is disposed in the opening portion 13. In this case, even though a part of the disk brake 18 is disposed in the opening portion 13 of the swing arm 12 where resonance of sounds is liable to occur, generation of sounds can be restrained as above-mentioned. Therefore, the degree of freedom in laying out the disk brake 18 relative to the swing arm 12 can be enhanced.

Figure 8:
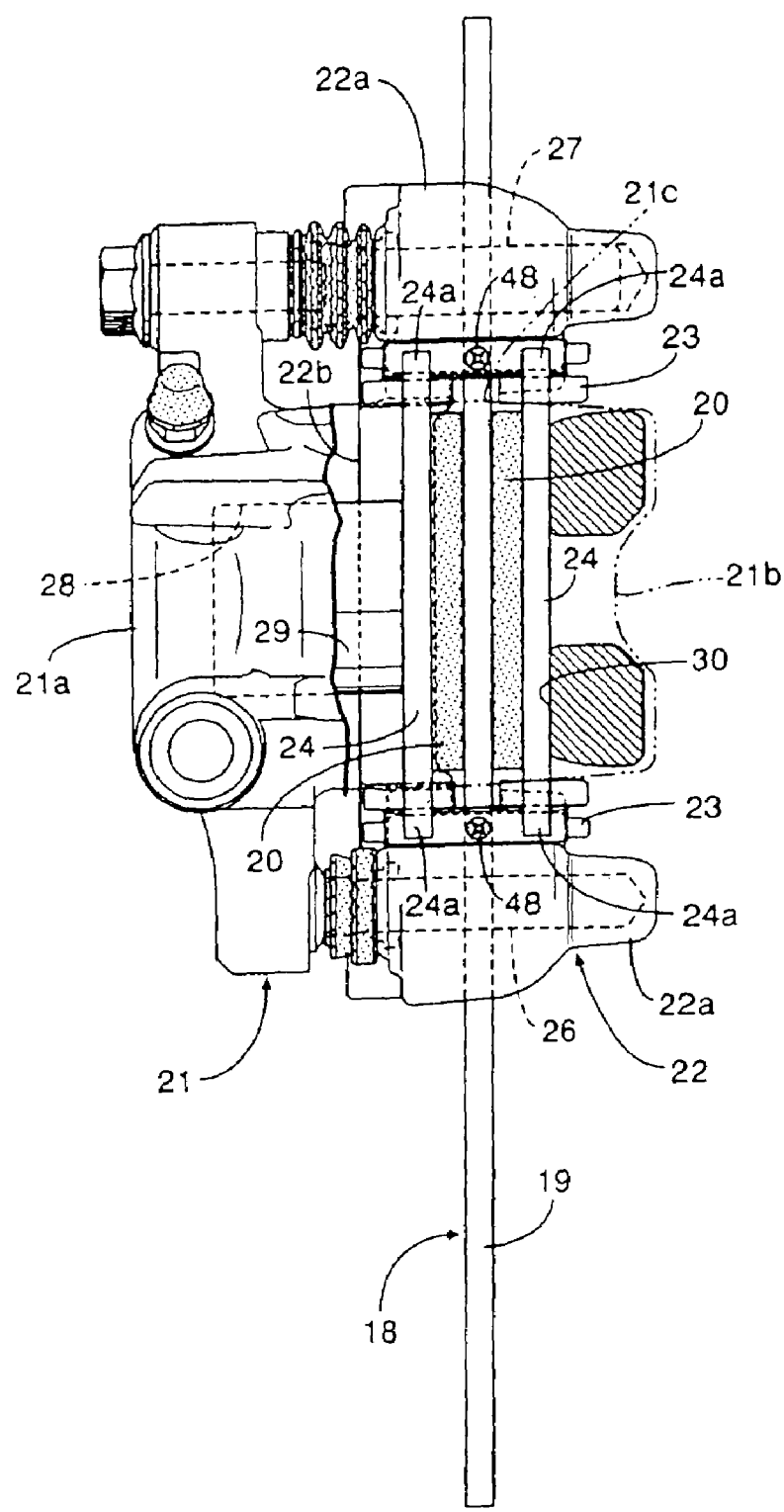
FIG. 8 is a view, corresponding to FIG. 2, of a second embodiment.

FIG. 8 shows a second embodiment of the present invention, in which the retainer 23 is fixed to the support portion 22a of the bracket 22 by a screw member 48, which is fixing means other than the retainer 23.

According to the second embodiment, the retainer supporting force for supporting the retainer 23 on the support portion 22a can be easily set to be not less than the received force exerted on the friction pad 20 from the brake disk 19.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A disk brake comprising:
   friction pads disposed opposite to a brake disk;
   a bracket provided with support portions for movably supporting said friction pads so as to permit sliding along an axial direction of said brake disk; and
   a retainer interposed between each of said friction pads and said support portions, each of the retainers including a pair of clamping pawls for clamping outer side surfaces of each of the support portions, the clamping pawls extending away from the friction pads in a direction toward ends of the bracket, wherein the clamping pawls are substantially identical in shape and are provided with curved portions, and the clamping pawls spring-clamp each of the support portions from both sides by springy forces generated by bending the curved portions, and wherein of a pad holding force with which said retainer holds said friction pad and a retainer supporting force for supporting said retainer on said support portions, at least said retainer supporting force is set to be not less than a received force exerted on said friction pad due to vibration.

2. The disk brake as set forth in claim 1, wherein said pad holding force is set to be not less than said received force and not more than said retainer supporting force.

3. The disk brake as set forth in claim 1, mounted to a swing arm, the swing arm supporting an axle of a rear wheel of a vehicle and being provided with an opening portion in a central portion thereof so that a part of said disk brake is disposed in said opening portion.

4. The disk brake as set forth in claim 2, mounted to a swing arm, the swing arm supporting an axle of a rear wheel of a vehicle and being provided with an opening portion in a central portion thereof so that a part of said disk brake is disposed in said opening portion.

5. The disk brake as set forth in claim 1, further comprising fixing means other than said retainer for fixing each of said retainers to said bracket.

6. The disk brake as set forth in claim 1, wherein the support portions of the bracket are disposed at positions spaced from each other along a circumferential direction of the brake disk, and are formed in a roughly U shape so as to be situated astride an outer circumferential portion of the brake disk.

7. The disk brake as set forth in claim 6, wherein the bracket includes a connection portion for connection between the support portions.

8. The disk brake as set forth in claim 1, wherein each of the retainers comprises:

a pair of first holding portions formed in a roughly U shape for springy fitting therein of projections of back metals of the friction pads; and a pair of second holding portions which are formed in a roughly U shape opened to an opposite side of the first holding portions so as to permit springy fitting therein of guide projections on the support portions of the bracket, the second holding portions being continuous with the first holding portions; and a connection portion situated astride an outer circumference of the brake disk and making connection between the second holding portions.

9. The disk brake as set forth in claim 8, wherein the first holding portions are spring-fitted in guide grooves of the support portions, and the second holding portions are spring-fitted in recessed grooves of the back metals.

10. The disk brake as set forth in claim 8, wherein the clamping pawls are continuous with a bottom portion of the U shape of the first holding portions.

11. The disk brake as set forth in claim 1, further comprising trapezoidal-shaped projected portions formed on both of the side surfaces of the support portions, the projected portions fronting opposite sides of the friction pads, wherein the projected portions have inclined surfaces, the inclined surfaces coming closer to each other in a direction away from the friction pads.

12. The disk brake as set forth in claim 1, further comprising projected portions formed on both of the side surfaces of the support portions, the projected portions fronting opposite sides of the friction pads, wherein each of the projected portions has two inclined surfaces, the inclined surfaces coming closer to each other in a direction away from the friction pads, wherein the clamping pawls of each of the retainers includes a first and a second holding portion abutting on the side surfaces of each of the support portions making spring abutment on the inclined surfaces of the projected portions, the first and second holding portions being situated astride the projected portions and fronting the opposite sides of the friction pads.

13. A disk brake comprising:

friction pads disposed opposite to a brake disk;

a C-shaped bracket provided with support portions for movably supporting said friction pads so as to permit sliding along an axial direction of said brake disk; and a retainer interposed between each of said friction pads and said support portions, each of the retainers including a pair of clamping pawls for clamping outer side surfaces of each of the support portions, the clamping pawls extending away from the friction pads in a direction toward ends of the bracket, wherein the clamping pawls substantially are identical in shape and are provided with curved portions, and the clamping pawls spring-clamp each of the support portions from both sides by springy forces generated by bending the curved portions, and wherein of a pad holding force with which said retainer holds said friction pad and a retainer supporting force for supporting said retainer on said support portions, at least said retainer supporting force is set to be not less than a received force exerted on said friction pad due to vibration.

14. The disk brake as set forth in claim 13, wherein said pad holding force is set to be not less than said received force and not more than said retainer supporting force.

15. The disk brake as set forth in claim 13, mounted to a swing arm, the swing arm supporting an axle of a rear wheel of a vehicle and being provided with an opening portion in a central portion thereof so that a part of said disk brake is disposed in said opening portion.

16. The disk brake as set forth in claim 14, mounted to a swing arm, the swing arm supporting an axle of a rear wheel of a vehicle and being provided with an opening portion in a central portion thereof so that a part of said disk brake is disposed in said opening portion.

17. The disk brake as set forth in claim 13, further comprising fixing means other than said retainer for fixing each of said retainers to said bracket.

18. The disk brake as set forth in claim 13, wherein the support portions of the bracket are disposed at positions spaced from each other along a circumferential direction of the brake disk, and are formed in a roughly U shape so as to be situated astride an outer circumferential portion of the brake disk.

19. The disk brake as set forth in claim 18, wherein the bracket includes a C-shaped connection portion for connection between the support portions.

20. The disk brake as set forth in claim 13, wherein each of the retainers comprises:

a pair of first holding portions formed in a roughly U shape for springy fitting therein of projections of back metals of the friction pads; and a pair of second holding portions which are formed in a roughly U shape opened to an opposite side of the first holding portions so as to permit springy fitting therein of guide projections on the support portions of the bracket, the second holding portions being continuous with the first holding portions; and a connection portion situated astride an outer circumference of the brake disk and making connection between the second holding portions.

21. The disk brake as set forth in claim 20, wherein the first holding portions are spring-fitted in guide grooves of the support portions, and the second holding portions are spring-fitted in recessed grooves of the back metals.

22. The disk brake as set forth in claim 20, wherein the clamping pawls are continuous with a bottom portion of the U shape of the first holding portions.

23. The disk brake as set forth in claim 13, further comprising trapezoidal-shaped projected portions formed on both of the side surfaces of the support portions, the projected portions fronting opposite sides of the friction pads, wherein the projected portions have inclined surfaces, the inclined surfaces coming closer to each other in a direction away from the friction pads.

24. The disk brake as set forth in claim 13, further comprising projected portions formed on both of the side surfaces of the support portions, the projected portions fronting opposite sides of the friction pads, wherein each of the projected portions has two inclined surfaces, the inclined surfaces coming closer to each other in a direction away from the friction pads, wherein the clamping pawls of each of the retainers includes a first and a second holding portion abutting on the side surfaces of each of the support portions making spring abutment on the inclined surfaces of the projected portions, the first and second holding portions being situated astride the projected portions and fronting the opposite sides of the friction pads.

* * * * *